United States Patent

Black

[15] 3,689,148
[45] Sept. 5, 1972

[54] TRANSPARENCY COPYING ATTACHMENT

[72] Inventor: Robert B. Black, 2925 Denner St., Corpus Christi, Tex. 75203

[22] Filed: Aug. 27, 1970

[21] Appl. No.: 67,491

[52] U.S. Cl.....................................355/18, 355/39
[51] Int. Cl.............................................G03b 27/32
[58] Field of Search....................................355/18, 39

[56] References Cited

UNITED STATES PATENTS

| | | | |
|---|---|---|---|
| 2,553,661 | 5/1951 | Liss | 355/18 |
| 1,292,205 | 1/1919 | Minor | 355/18 |
| 1,488,950 | 4/1924 | Steer | 355/18 |
| 2,574,072 | 11/1951 | Updegraff | 355/18 X |
| 2,602,369 | 7/1952 | Tuttle | 355/39 |

FOREIGN PATENTS OR APPLICATIONS

| | | | |
|---|---|---|---|
| 1,178,692 | 9/1964 | Germany | 355/39 |

OTHER PUBLICATIONS

Rothschild, N. " L S R' s: More Reach Than You Think," Popular Photography, January 1969, pg. 123.

Primary Examiner—Samuel S. Matthews
Assistant Examiner—Michael Harris
Attorney—Synnestvedt and Lechner

[57] ABSTRACT

A tubular structure having at one end a bayonet or screw mounting device is proportioned to interfit with a complementary lens mounting device on a single lens reflex camera, so that by removal of the camera lens from the camera the device may be connected with the camera. The camera lens may be mounted within the device and thereby utilized as the optical system of the conversion device. The tubular structure further has a light inlet or light source associated with its end remote from the camera end, and the tubular structure is slotted intermediate the light source end and the position of the lens when mounted in the device so that a slide or transparent element having a photographic image thereon may be inserted in the slot and may be directly converted by operation of the camera. Provision is also made for insertion of a correction filter.

10 Claims, 3 Drawing Figures

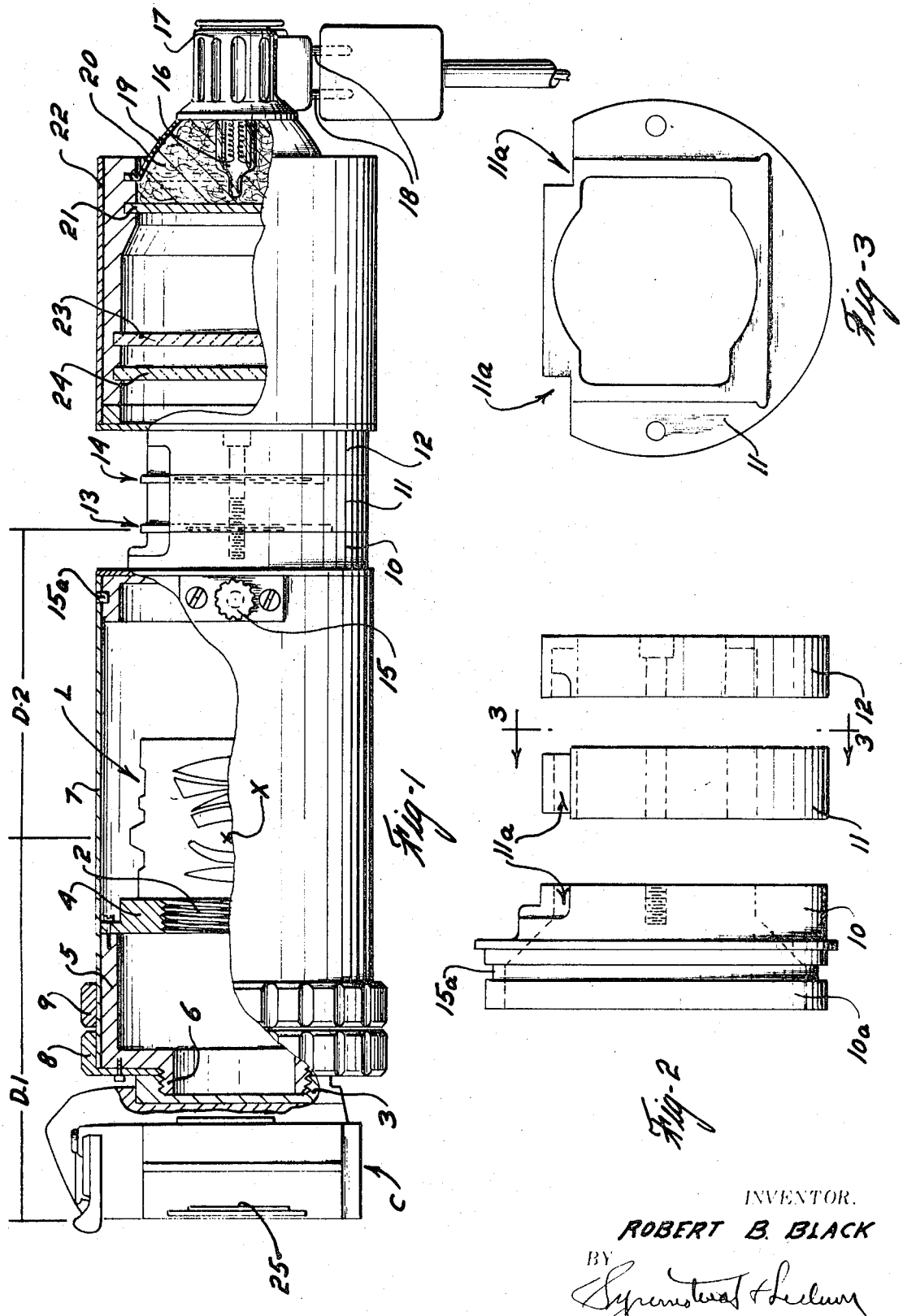

TRANSPARENCY COPYING ATTACHMENT

This invention relates to a photographic conversion device and is particularly concerned with a device adapted for conversion of color transparencies, such as the well known 35 mm. color slides extensively used in both amateur and professional photography. While the device of the invention is especially adapted for conversion of color slides to other color negatives or prints or to black and white negatives, the device may also be used for copying.

Various devices of this general kind are known, but in general they are complex, expensive and/or inconvenient to use, in consequence of which most conversion operations are performed in professional studios or by color film and print manufacturers or processors.

One of the major objects of the present invention is the provision of a photographic conversion device which is exceedingly simple, accurate and reliable in use, so that the device may readily be employed by amateurs, without calling upon professional or commercial assistance.

The arrangement of the invention is particularly adapted for use with the relatively recently developed cameras of the single lens reflex type, in which the viewer and built-in light meter receive light through the same lens used for exposure of the film in the camera. The advantages of the use of the invention in combination with such a camera will appear more fully hereinafter as this description proceeds.

In addition, having in mind that the modern, widely used camera, especially cameras of the single lens reflex type, have lenses or lens systems of high quality which are well adapted not only to original photography, but also to conversion and copying work, the present invention contemplates a conversion device arranged so that the lens of the camera may be remove from the camera and mounted in the device, and further contemplates that the device itself may then be connected with the camera. In this way the high quality lens of the camera may be used not only for the original photography but also for conversion work. In view of this feature of the arrangement of the invention, the conversion device does not require the purchase of an extra lens, which is naturally one of the most expensive components of such a system.

Among the well known cameras which have the type of lens system above referred to are cameras known as Leicaflex, Zeiss, Honeywell-Pentax, Minolta SRT–101, Bell and Howell-Canon, and the Nikon-F.

The invention also has as an object the provision of a conversion device of the general kind referred to in which adjustments are virtually eliminated, thereby greatly simplifying the operation and rendering the operation substantially foolproof.

According to another aspect of the invention a conversion device is provided which not only utilizes the lens systems or assembly of a camera but which also incorporates or embodies a light source simulating the desirable spectrum of normal noon-day sunlight and having appropriate intensity and diffusion so that high quality reproductions may be obtained.

The invention also provides for convenient insertion and removal of color transparencies to be converted and for correction of inaccuracies in the picture horizon.

How the foregoing objects and advantages are attained together with others which will occur to those skilled in the art will appear more fully from the following description referring to the accompanying drawings, in which:

FIG. 1 is an elevational view with parts in axial section, showing a device according to the present invention as associated with a camera;

FIG. 2 is an enlarged, exploded view of certain parts in the central region of the device as shown in FIG. 1; and FIG. 3 is a view taken as indicated by the section line 3—3 on FIG. 2, illustrating the shape of certain of the parts in the region where the slides to be converted are inserted.

The conversion device of the present invention in general comprises a tubular structure one end of which is adapted to be associated with a camera and having a light source or light inlet associated with the other end.

In FIG. 1 the camera is indicated at C and the lens assembly of the camera is indicated generally at L. It will be noted that the lens assembly is provided with an external mounting thread 2. This mounting thread in normal use of the camera is used to mount or support the lens on the camera by screwing the threaded part 2 into the internally threaded lens mounting part 3 of the camera. However, when the lens is being used in the conversion device, the externally threaded part 2 is screwed into the internally threaded part 4 for supporting the lens upon the tube 5. At its left end the tube 5 is provided with an externally threaded mounting part 6 threaded into the internally threaded part 3 on the camera which normally serves to mount the lens assembly.

It will be understood that the device of the invention may be arranged to cooperate with a bayonet type of lens mount where the camera is so equipped, instead of the screw thread shown in the drawing.

The tubular structure of the conversion device further includes the tube 7 adapted to be telescopically assembled and separated with respect to the tube 5. An annular mounting ring 8 is connected with the tube 5 and this ring, in cooperation with the external surface of the tube 5 provides an annular groove for receiving the left hand end of the tube 7. A ring 9 is preferably secured to the tube 7, these two rings 8 and 9 being externally knurled or configured serve to facilitate manipulation of the tubes 5 and 7 during assembly and separation. Proper interpositioning of the tubes 5 and 7 when in assembled relation may be effected by any type of fastening device, such as a pin and slot twist lock or bayonet connection. This connection will provide for ready separation of the tubes 5 and 7 when it is desired to assemble the lens L for conversion work, or remove the lens from the conversion device and reassemble the lens with the camera for subsequent photographing.

Beyond the right hand end of the tube 7 the tubular structure is provided with a central section made up of parts 10, 11 and 12 (see FIGS. 1, 2 and 3). Part 10 is adapted to fit into the right hand end of the tube 7 and is adapted to be angularly adjustable about the axis of the tube for a purpose to be explained. Parts 11 and 12 are positioned in sequence or stacked with part 10 and are configured to provide a slot in the region indicated at 13 in FIG. 1 for the insertion of the color transparency or slide to be converted. A slot is provided at 14 for insertion of a color filter. In FIG. 1 a slide is indicated as positioned in the slot at 13 and a filter is indicated as positioned in the slot at 14.

From FIGS. 2 and 3 it will be seen that the upper portion of the members 10, 11 and 12 in the slotted region of the tubular structure are cut out as indicated at 11a, 11a. These cut outs readily accommodate the thumb and finger by means of which the customary cardboard frames of the slides may be handled at the corners as is desirable in order to avoid finger markings of the slides. The filters may be similarly handled.

In a typical device according to the invention the slotted parts 10, 11 and 12 are arranged and proportioned to accept the widely used 2 by 2 inches cardboard mounts employed for 35 mm. color slides. The mounts for such slides ordinarily have an inside frame size measuring about ⅞ by 1 ⅜ inch. Similar 2 by 2 inch cardboard mounts are preferably used for the filters to be inserted at 14, but the inside frame size for the filters should be somewhat larger than the inside dimensions of the slide frames, for instance about 1 ½ by 1 ½ inch.

The rotative motion of part 10 with respect to the tube 7 is provided for the purpose of permitting adjustment of the angular position of the slide inserted at 13 in relation to the left end portion of the structure including the camera, so that a slide having an inaccurate horizon line may be reproduced in a position to correct for such inaccuracy. Preferably some fastening device is employed in order to secure the part 10 in the desired angular position. This device may comprise a knurled knob 15 operating a set screw projecting into the slot 15a formed in the mounting sleeve 10a of the part 10.

Light filters may or may not be inserted into the slot 14, as desired, in order to modify the color in the conversion or reproduction being made.

The light inlet, i.e., the right hand end of the tubular part 12 may receive light from any one of a number of sources, but preferably the light source comprises a quartz lamp of known type such as indicated at 16, for example the well known quartz halogen (quartz iodine) lamp, which provides light with a Kelvin temperature of 3,200° to 3,400° F. Some color correction such as an 80–C or 80–B filter is preferably utilized in order to remove excessive red and yellow rays.

In the arrangement illustrated in the drawings, the quartz lamp 16 is mounted in a socket 17 having current supply terminals 18. The lamp is positioned within the reflector 19 for directing the light toward the left when viewed as in the figure of the drawing. The reflector is advantageously lightly and uniformly packed with spun glass indicated at 20, the spun glass being confined between the reflector and the clear heat resistant glass disc 21, the spun glass being provided for purposes of light diffusion. The lamp or bulb 16 and the associated parts just described are mounted in the right hand end of the tubular structure 22 which in turn is connected with the light inlet side of the part 12. Within the tubular structure 22 a filter 23 is preferably arranged, for instance a filter of the blue type or the filter known as 80–B, which is adapted to remove excessive red and yellow rays normally emitted from a quartz halogen bulb. In addition to filter 23, a light diffuser 24 may be provided, thereby further smoothing out and evenly distributing the light rays from the bulb as they are delivered through the color transparency to be converted.

Ultimately, the light rays from the light source or bulb 16 pass through the lens L and into the camera C, for projection upon the film plane 25 in the camera.

In order to ensure avoidance of reproducing portions of the standard cardboard mount for color transparencies being converted, the support or mounting for the lens L within the device is arranged to provide for slight magnification of the image on the slide being reproduced when that image is projected upon the film plane of the camera. With a typical single lens reflex camera, this requires positioning the optical center x of the lens at a distance D–1 from the film plane 25 slightly greater than the distance D–2 from the optical enter x of the lens to the plane of the slide introduced into the slot at 13.

It is desirable that all of the interior surfaces of the copying device which are exposed to light have a dull black light absorbing finish, in order to avoid reflections which would tend to adversely influence the conversion being made.

In typical use of the device of the invention, color slides may be in the process of being projected onto a screen and when a slide is reached which it is desired to either convert or otherwise reproduce, that slide may immediately be inserted into the slot 13 of the conversion device of the invention. With the device associated with a single lens reflex camera and with a light source embodied in the equipment as illustrated in the drawing, the camera may be appropriately adjusted by means of its built-in light meter, thereby providing for immediate accurate exposure of the negative or positive film being used in the camera, the normal shutter trip being utilized for this purpose. The slide being converted may then be immediately returned to its original position in the group of slides being viewed. In this way maximum convenience for conversion is provided without any necessity for shipment or delivery of the selected slide to some professional or commercial studio.

It will be observed that no complex adjustments are needed in effecting this operation, except for the normal exposure, if necessary. Normally exposure does not vary more than one or two stops, and with a little experience, a quick glance at the film transparency will indicate whether exposure should, for example, be at one-fourth, one-eighth or one-fifteenth second. If necessary, a correction for inaccuracy in the horizon of the slide being converted may be made.

Although any lens opening desired may be used, with corresponding change in exposure time, it has been found that the sharpest detail over the entire film area is obtained with the smallest lens opening, for example f16. Lens focus is preferably set at infinity.

Because the entire structure of the conversion device is unitary and rigid, involving the use of no bellows or other collapsible parts, accuracy of reproduction is assured.

With slight modification, devices of the kind herein disclosed may readily be adapted for use with any of the well known and widely used cameras, such as those mentioned above, or with any other camera, but especially with cameras of the type in which a built-in light meter is provided and arranged to receive its light through the camera lens, as in the single lens reflex type. It is also of advantage in such cameras that the viewer permits close inspection of the slide to be converted and appropriate correction of the light settings prior to operation of the camera, thereby eliminating the guesswork commonly associated heretofore with reproduction or conversion equipment. The arrangement of the invention may be employed not only for color slide conversion or duplication, but also to convert color slides to black and white negatives, as is sometimes desired, and for producing black and white or color prints, or for making enlargements of any desired size.

In order to minimize length of burning of the quartz lamp 16 and minimize heating generated by that lamp, it is preferred to utilize a conveniently operable lamp switch. For this purpose a foot operated switch is preferred for the lamp, so that both hands will be free.

It will be understood that various light sources may be employed instead of the quartz halogen lamp. For example, a flash type of light source may be used, but this is not preferred for most purposes, because it does not permit accurate optical reading of the light values of the slide by means of the built-in light meter of the camera. When other light sources are employed, the tubular light source assembly as shown in FIG. 1 may merely be separated from the remainder of the structure and the other light source similarly applied. If sunlight is used for this purpose, it is contemplated that a light diffuser mounted in a suitable frame adapted to cooperate with part 12 would be employed. The camera with the assembled conversion device may then be aimed in a direction providing suitable lighting. In this case the light meter may of course be employed and correction to the proper exposure may be made.

After use of the device in the manner described, it may readily be separated from the camera by unscrewing the thread 6 or other similar connection device, and upon separation of the tubes 5 and 7 the lens L may readily be removed from the tube 5 and returned to its original position on the camera.

The device of the invention is also of advantage in that the relative location of the light source, slotted portion for receiving slides to be converted, lens and camera, with the tubular structure shielding the light path all the way from the slide slot to the camera, completely avoids entrance of environmental light rays at any point in the system which will adversely influence the reproduction or conversion.

It is contemplated that all parts of the equipment of the invention will be made of metal or suitable rigid plastics, and will not even employ parts which are telescopically adjustable for focusing or other operating purposes. The inaccuracies and inefficiencies of bellows type of equipment are therefore completely eliminated.

A sturdy tripod provides a convenient and stable base for mounting the camera-film converter assembly.

I claim:

1. A photographic conversion device adapted for use with a camera having a lens assembly and separable interfitting lens mounting parts on the camera and on the lens assembly, the conversion device comprising a tubular structure having at a first end thereof a mounting part proportioned to interfit with the lens mounting part on the camera upon removal of the camera lens and having at the other end a light inlet, the tubular structure being transversely slotted in a region intermediate its ends to receive a transparent element having a photographic image thereon, and a means to support the lens assembly in the tubular structure between said slot and said first end of the tubular structure.

2. A photographic device as defined in claim 1 in which the lens support in the tubular structure between the slot and the first end of the tubular structure comprises a mounting part proportioned to interfit with the mounting part on the lens assembly.

3. A photographic conversion device adapted for use with a camera having a lens assembly and separable interfitting lens mounting parts on the camera and on the lens assembly, the conversion device comprising a tubular structure having at a first end thereof a mounting part proportioned to interfit with the lens mounting part on the camera upon removal of the camera lens and having at the other end a light inlet, the tubular structure being transversely slotted in a region intermediate its ends to receive a transparent element having a photographic image thereon, a lens support in the tubular structure between said slot and said first end of the tubular structure, and a device for adjusting the relative angular positions of the slotted portion of the structure and the end thereof adapted to be mounted on the camera.

4. A photographic conversion device adapted for use with a camera having a lens assembly and separable interfitting lens mounting parts on the camera and on the lens assembly, the conversion device comprising a tubular structure having at a first end thereof a mounting part proportioned to interfit with the lens mounting part on the camera upon removal of the camera lens, a light source enclosed within the other end of the tubular structure positioned to direct light through the tubular structure toward the first end thereof, the tubular structure being transversely slotted in a region intermediate its ends to receive a transparent element having a photographic image thereon, and a support for the lens assembly in the tubular structure between said slot and said first end of the tubular structure.

5. A photographic device as defined in claim 4 in which the light source comprises a quartz lamp.

6. A photographic conversion device adapted for use with a camera having a lens assembly and separable interfitting lens mounting parts on the camera and on the lens assembly, the conversion device comprising a tubular structure comprising an external tubular element and an internal tubular element adapted to be telescopically assembled and separated, the internal tubular element projecting from the end of the external element when the elements are telescopically assembled and the projecting end of the internal element having a mounting part proportioned to interfit with the lens mounting part on the camera upon removal of the camera lens, the tubular structure having a light inlet at its end remote from said mounting part, the tubular structure being transversely slotted in a region intermediate its ends to receive a transparent element having a photographic image thereon, and a lens support in the tubular structure between said slot and said mounting part, said lens support comprising a mounting part proportioned to interfit with the mounting part on the lens assembly.

7. A photographic conversion device adapted for use with a camera having a lens assembly and separable interfitting lens mounting parts on the camera and on the lens assembly, the conversion device comprising a tubular structure having at a first end thereof a mounting part proportioned to interfit with the lens mounting part on the camera upon removal of the camera lens and having at the other end a light inlet, the tubular structure being transversely slotted in a region intermediate its ends to receive a transparent element having a photographic image thereon, and a support for the lens assembly in the tubular structure between said slot and said first end of the tubular structure, the support being located to support the lens in a position with the optical center of the lens closer to a transparent element received in the slot than to the film plane of a camera with which the device is used.

8. A photographic copying device comprising, in combination with a single lens reflex camera having a lens assembly and separable interfitting lens mounting parts on the camera and on the lens assembly, a tubular structure having at a first end thereof a mounting part interfitting with the lens mounting part on the camera and having at the other end a light inlet, the tubular structure being transversely slotted in a region intermediate its ends to receive a transparent element having a photographic image thereon, and the lens assembly of the camera being mounted in the tubular structure between said slot and said first end of the tubular structure.

9. A photographic device as defined in claim 8 in which the distance between the optical center of the lens assembly and the plane of the slot for receiving the transparent element is less than the distance from the optical center of the lens assembly to the film plane of the camera.

10. A photographic conversion device adapted for use with a camera having a lens assembly and separable interfitting lens mounting parts on the camera and on the lens assembly, the conversion device comprising a tubular structure having at a first end thereof a mounting part proportioned to interfit with the lens mounting part on the camera upon removal of the camera lens and having at the other end a light inlet, the tubular structure being transversely slotted in a region intermediate its ends to receive a rectangular slide, the slotted portion of the tubular structure being externally notched to accommodate the thumb and a finger by which the corners of a slide are engaged for handling the slide when inserting it into or removing it from the slot and a support for the lens assembly in the tubular structure between said slot and said first end of the tubular structure.

* * * * *

UNITED STATES PATENT OFFICE
CERTIFICATE OF CORRECTION

Patent No. 3,689,148     Dated September 5, 1972

Inventor(s) Robert B. Black

It is certified that error appears in the above-identified patent and that said Letters Patent are hereby corrected as shown below:

In the listing of references cited, the number of the Minor Patent should be changed from "1,292,205" to --1,292,005--.

Column 4, Line 16, "enter" should read --center--.

Signed and sealed this 13th day of February 1973.

(SEAL)
Attest:

EDWARD M. FLETCHER, JR.          ROBERT GOTTSCHALK
Attesting Officer                Commissioner of Patents